(No Model.) 7 Sheets—Sheet 1.
E. S. SMITH.
CASH REGISTER AND INDICATOR.

No. 538,707. Patented May 7, 1895.

WITNESSES
INVENTOR (No Model.)
7 Sheets—Sheet 3.

E. S. SMITH.
CASH REGISTER AND INDICATOR.

No. 538,707. Patented May 7, 1895.

WITNESSES
INVENTOR
Elmer S. Smith
by Hallock & Lord
Attys (No Model.) 7 Sheets—Sheet 4.
E. S. SMITH.
CASH REGISTER AND INDICATOR.

No. 538,707. Patented May 7, 1895.

Fig. 4½

WITNESSES:

INVENTOR
Elmer S. Smith
BY
Hallock & Lord
ATTORNEYS.

(No Model.)  7 Sheets—Sheet 5.

E. S. SMITH.
CASH REGISTER AND INDICATOR.

No. 538,707.  Patented May 7, 1895.

WITNESSES:
Wm Marles Jr,
J Keen Hallock

INVENTOR
Elmer S. Smith
BY Hallock & Lord
ATTORNEYS.

(No Model.) 7 Sheets—Sheet 6.
E. S. SMITH.
CASH REGISTER AND INDICATOR.
No. 538,707. Patented May 7, 1895.
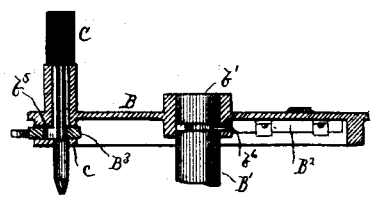
Fig. 7
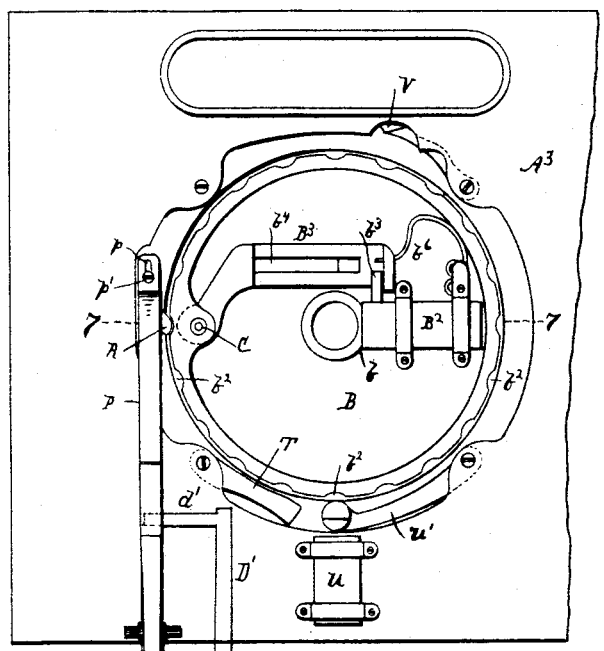
Fig. 6
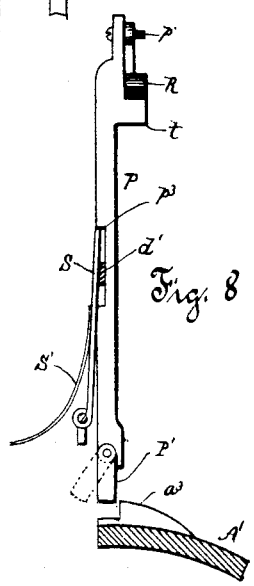
Fig. 8
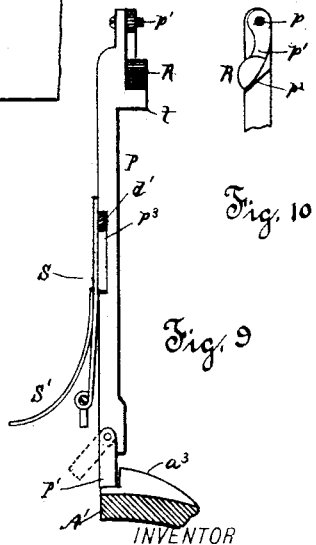
Fig. 10
Fig. 9
WITNESSES:
INVENTOR
Elmer S. Smith
BY Hallock & Lord
ATTORNEYS.

(No Model.) 7 Sheets—Sheet 7.
E. S. SMITH.
CASH REGISTER AND INDICATOR.
No. 538,707. Patented May 7, 1895.

WITNESSES:
INVENTOR
Elmer S. Smith
BY Hallock & Lord
ATTORNEYS.

UNITED STATES PATENT OFFICE.

ELMER S. SMITH, OF BOUND BROOK, NEW JERSEY.

CASH REGISTER AND INDICATOR.

SPECIFICATION forming part of Letters Patent No. 538,707, dated May 7, 1895.

Application filed May 14, 1894. Serial No. 511,127. (No model.)

*To all whom it may concern:*

Be it known that I, ELMER S. SMITH, a citizen of the United States, residing at Bound Brook, in the county of Somerset and State of New Jersey, have invented certain new and useful Improvements in Cash Register and Indicator Machines; and I do hereby declare the following to be a full, clear, and exact description of the invention, such as will enable others skilled in the art to which it appertains to make and use the same.

This invention relates to cash registers and indicators and particularly to that type of such machines as are known as revolving dial machines, of which type the machine represented in Letters Patent of the United States, No. 500,164, dated June 27, 1893, and issued to E. F. Spaulding, is an example; and this invention consists in certain improvements in the construction thereof as will be hereinafter fully set forth, and pointed out in the subjoined claims.

Figure 1:
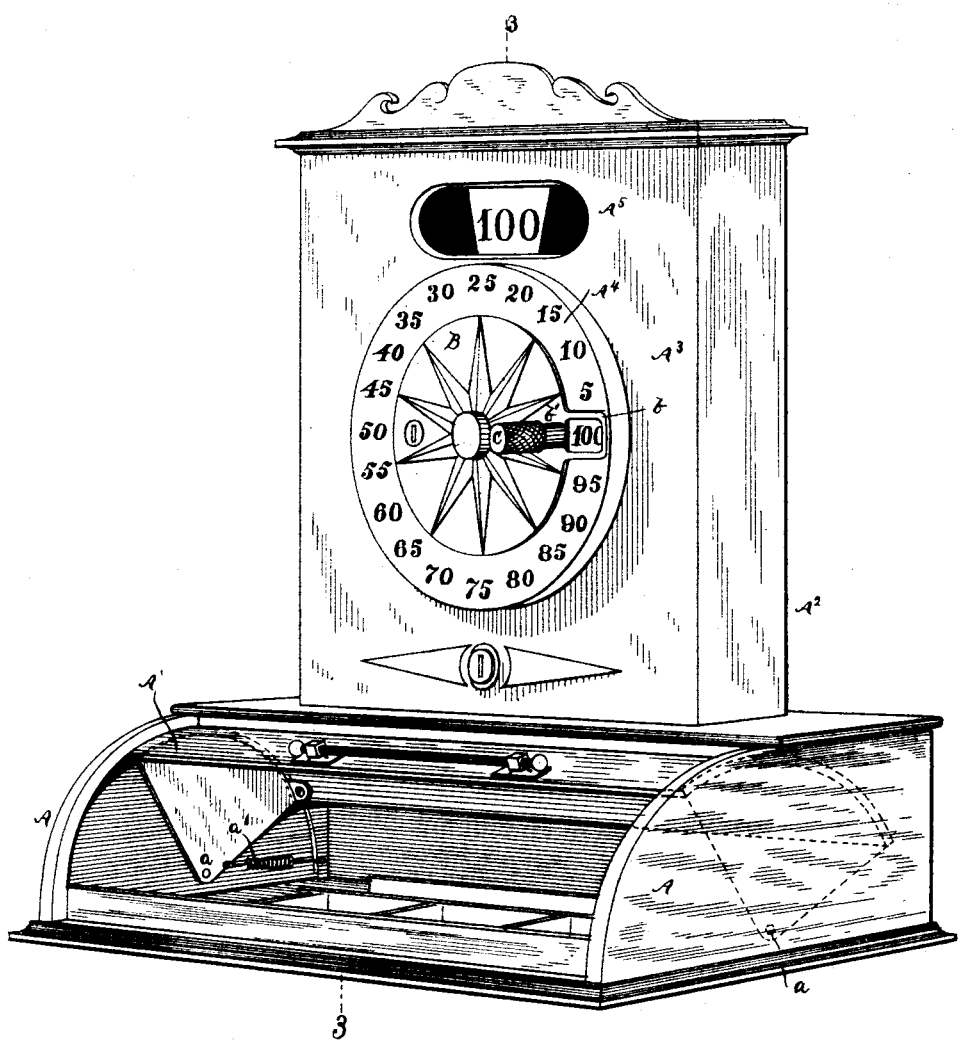
Figure 2:
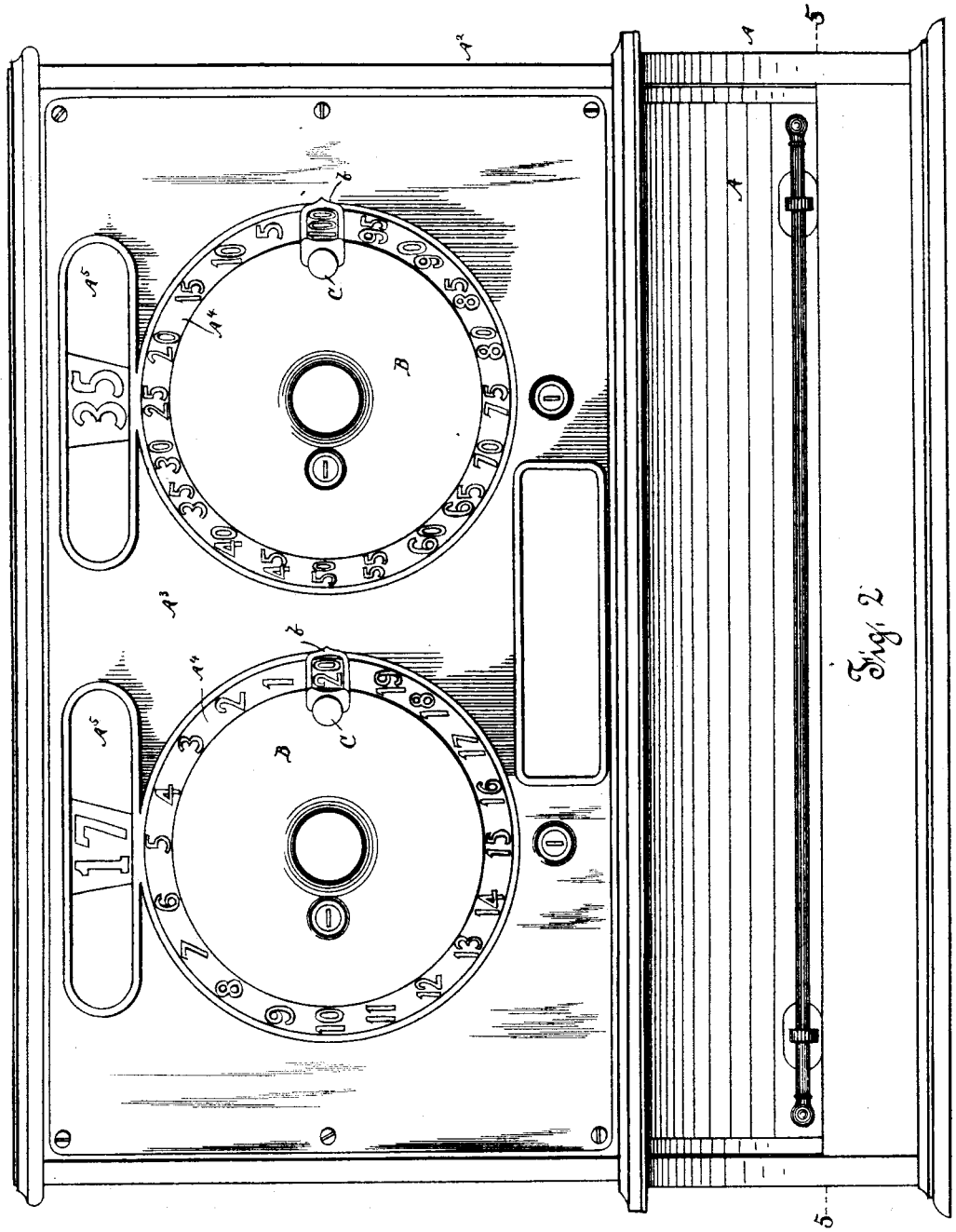
Figure 3:
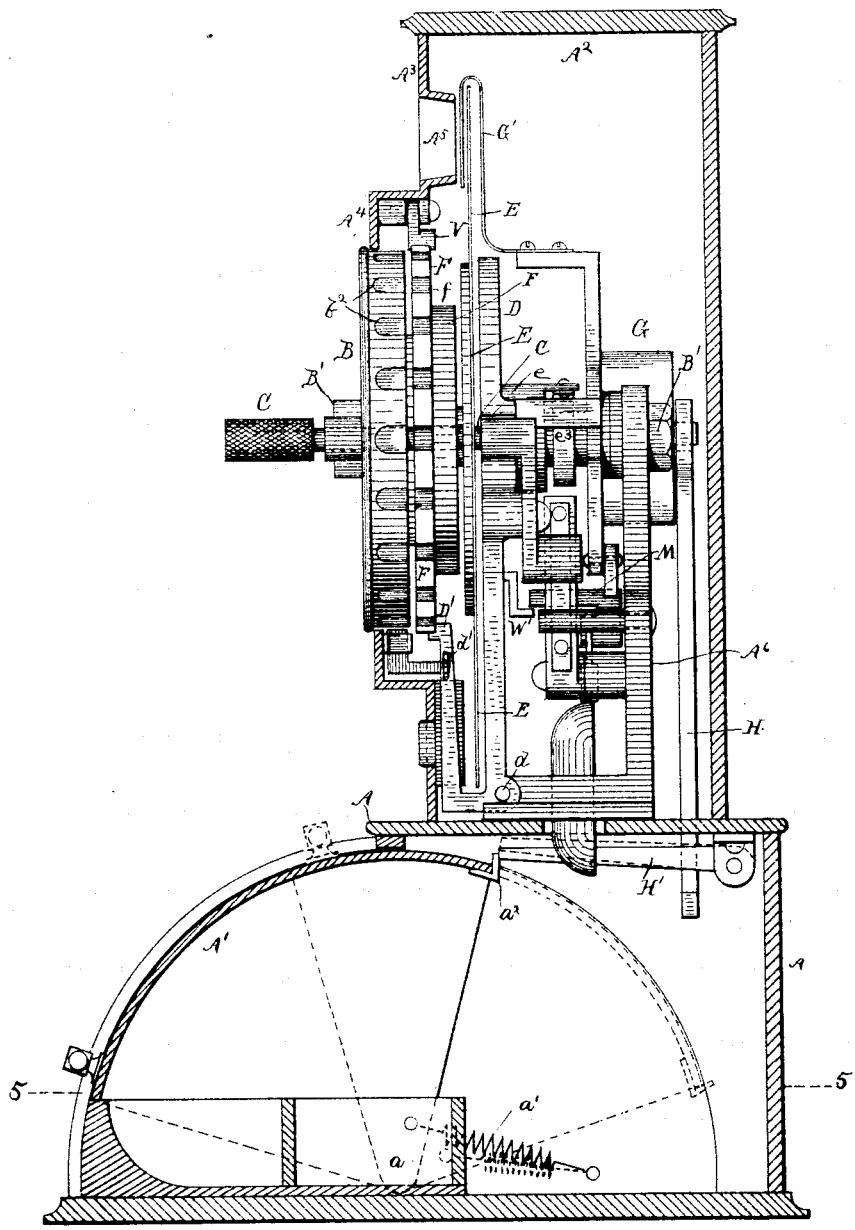
Figure 4:
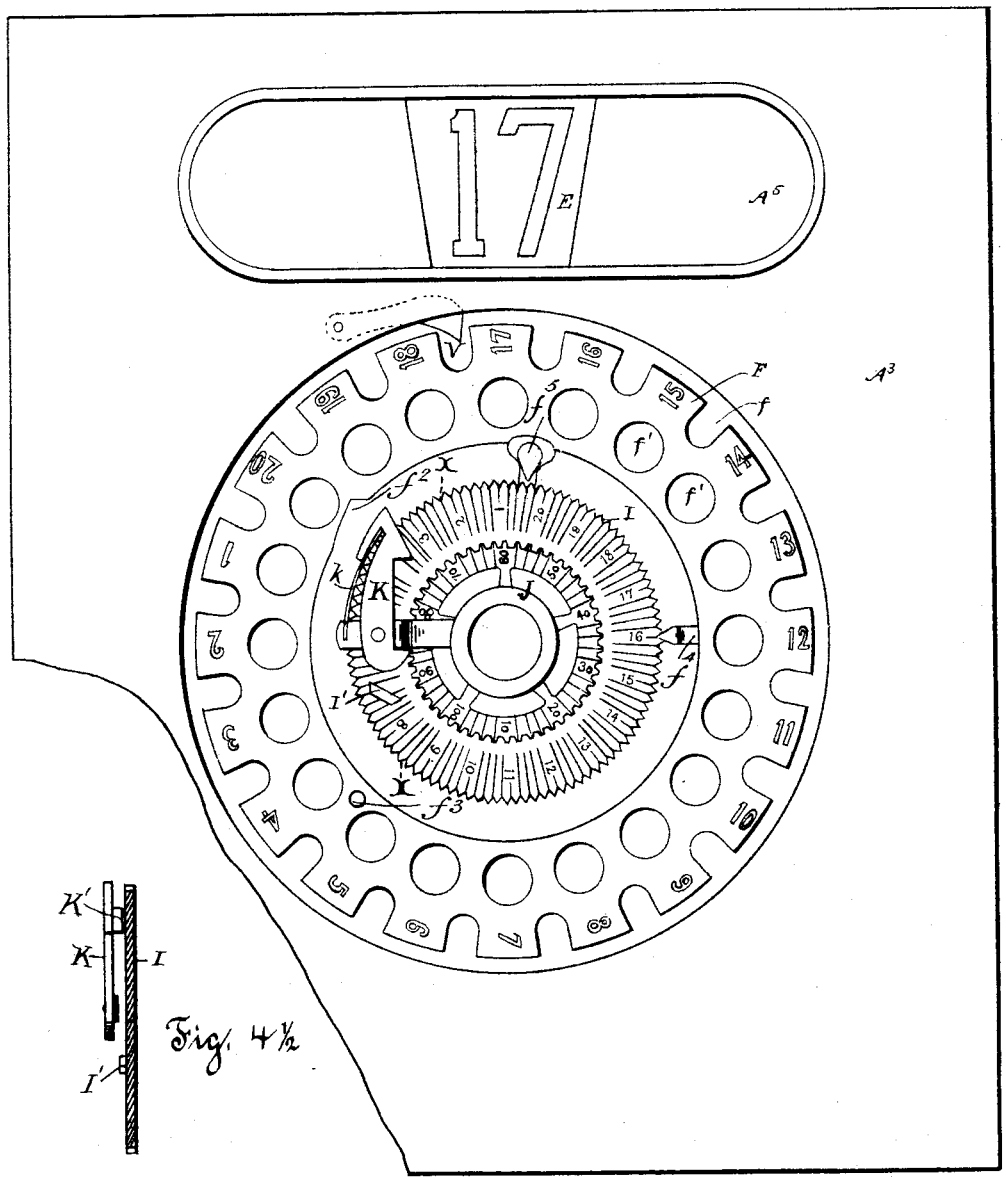
Figure 5:
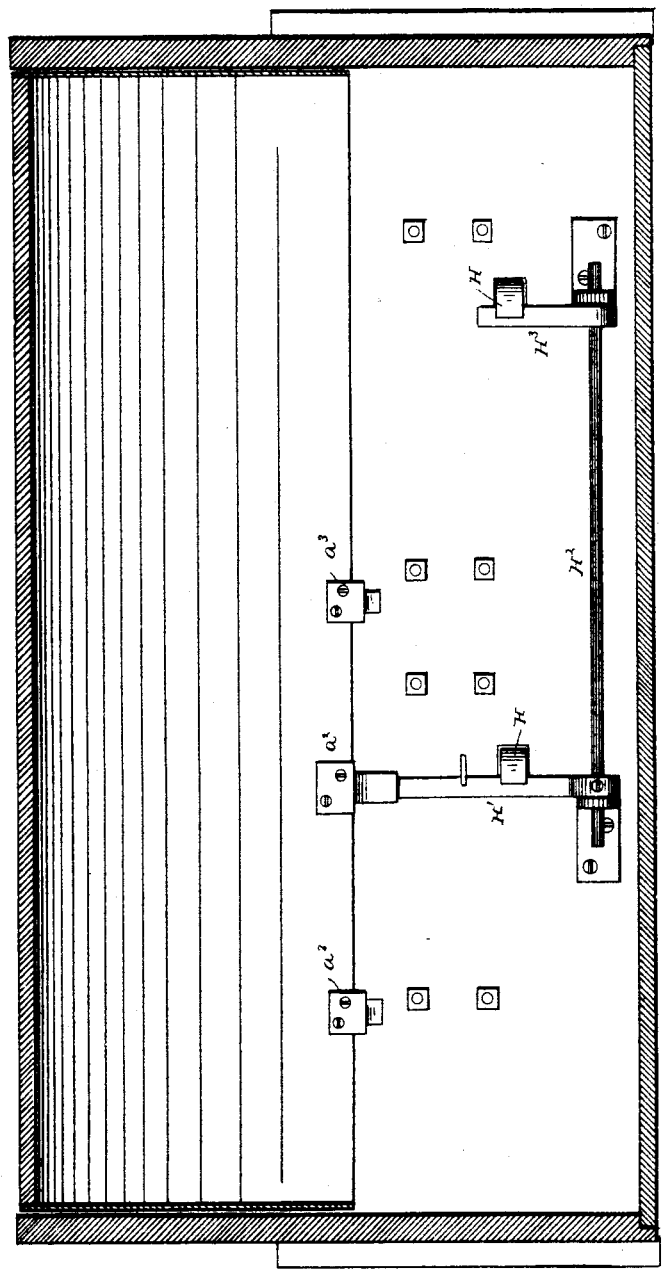
Figure 11:
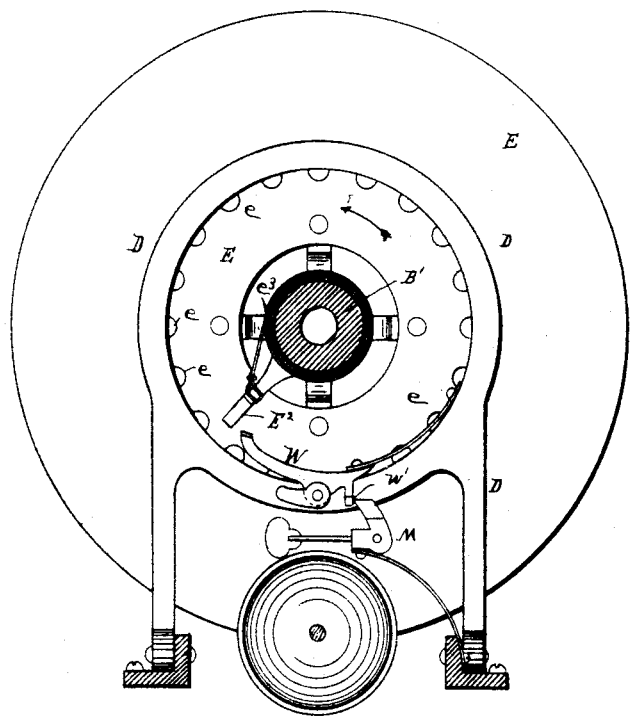
Figure 12:
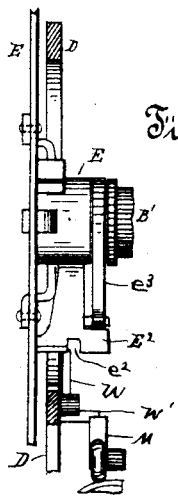

My invention is illustrated in the accompanying drawings as follows:

Figure 1 is a perspective view of my improved machine with the money-till open. Fig. 2 is a front elevation of my machine with two dials, one for dollars and the other for cents. Fig. 3 is a vertical transverse section of the machine on the line 3 3 in Fig. 1, with working parts shown in elevation. Fig. 4 is an elevation of the face of the machine with the operating wheel and dial removed, showing parts back of the same. Fig. 4½ is a section on the line $x\ x$ in Fig. 4. Fig. 5 is a horizontal sectional view of the machine, as shown in Fig. 2 on the line 5 5 in said figure, looking upwardly from said line. Fig. 6 is an elevation from the rear of the face-plate $A^3$ with the operating-disk in place. Fig. 7 is a horizontal section through the operating-disk on the line 7 7 in Fig. 6. Figs. 8, 9, and 10 are detail views showing changed positions of the parts shown. Fig. 11 is a rear elevation showing the bell-ringing mechanism. Fig. 12 is a side view, partly in section, of the parts seen in Fig. 11.

The machine consists of a cabinet A, having a pivoted till cover A'; an upper case $A^2$, with a metallic face plate $A^3$, on which is a dial $A^4$, and through which is an opening $A^5$, to observe the indicator; a frame $A^6$ for supporting the works contained within the upper case; and operative mechanism for registering and indicating sales, locking the till, ringing the bell, &c.

The operative mechanism, in its general features, is the same as in the Spaulding patent above referred to, that is to say, there is an operating disk B, carrying an operating pin C, a cents or units wheel F, having peripheral notches $f$, and perforations $f'$, through which the pin C, passes; an indicator or tablet wheel E, also having perforations $e$, through which the operating pin passes; a tumbler G, that carries a shutter G', and all these revoluble parts are mounted on a common central shaft B'.

There is a tilting locking frame D, as in the said Spaulding patent, that is pushed back by the end of the operating pin C, and carries back with it a finger D', that engages the peripheral notches $f$, on the units wheel F, and thus disengages the same and allows the revoluble parts to be turned by the operating pin.

There is a vertically moving bar H, moved by the tumbler G, the same as the drawer locking bolt H, in the said Spaulding patent, but in the present device, as shown, there is no sliding drawer, but in place thereof there is a money receptacle with a pivoted till cover A', pivoted at $a$, and drawn open by a spring $a'$, and held shut by a catch-dog H', and the bar H, in this instance, instead of being a draw bolt, serves to lift the dog H', and disengage it from the catch plate $a^2$, on the till cover, and thus leave the till free to be opened by the spring $a'$. The means by which the bar H is moved in this case is the same as in the said Spaulding patent, and needs no special description here, and the present machine may be used with a drawer.

Where there are two dials on the face plate, as seen in Fig. 2 there are two separate working parts in the case, and each of these operate a vertical bar H, and in place of having two separate catch levers H', which would not do, I operate the catch lever H', from one of the bars H, direct, and from the other bar H, by a lever $H^3$, and rock-shaft $H^2$, as seen in Fig. 5.

In the said Spaulding patent, the operating disk has a dial on its face, and an indicator on the case, but in the present construction, I place the dial $A^4$ on the case, and the index or pointer $b$, on the operating wheel. The index $b$, is slotted, and extends out over the dial, so that the figures indicated, will be seen through it, as seen in Fig. 1.

In the present construction there are the cent register wheel F and the dollar register wheel I, and the cent registering wheel also has a cam notch, $f^2$, and a pin, $f^3$, which operate alternately upon pawls $f^4$, and $f^5$, and the pawls so operated are depressed alternately against the beveled sides of the teeth on the periphery of the dollar wheel, each pawl actuating the dollar wheel one half the space of a tooth, said pawls being moved out of engagement by springs (not shown) all of which parts are shown in detail and minutely described in said Spaulding patent. In the present device I have added a third wheel, which is moved one space for each revolution of the dollars wheel, thus increasing the registering capacity of the machine. Figs. 4 and $4\frac{1}{2}$ show this improvement as follows: I, marks the dollars wheel and J, the added wheel. This wheel J, is moved by an escapement action, which consists of an anchor lever K, which is held in one position by a spring $k$, and is moved into the opposite position by a cam-lug I', on the wheel I, contacting with a cam-face or lug K', on the lever K.

An important feature of my invention, consists in the means provided for compelling the operator to complete each operation of registering when once begun, in order to prevent mistakes or frauds.

It will be understood that when an operation is completed, the operating disk always stands with the operating pin opposite 100 in the cents dial or 20 in the dollars dial. To make a new operation, the operator pulls the operating pin C, toward him to its outward limit, and then moves the disk until the index $b$, covers the figures in the dial representing the amount to be registered. He then pushes the pin C, in to its limit and moves the disk toward the starting point, and my improvement compels him to finish the movement, by preventing the withdrawal of the pin C, until the registration is completed. The means by which this is accomplished are as follows: The pin C, has a shoulder $c$, (as seen in Fig. 7) which, as soon as it is pushed in to its limit, is engaged by a sliding bar $B^3$. (See Fig. 6.) Hence as soon as the pin is pushed in to its limit, it cannot be withdrawn until the bar $B^3$ is pushed back, so as to disengage the pin. The bar $B^3$ slides on a lug $b^4$ on the disk, and is held forward by a spring $b^7$ and it extends when forward, out into the indentation $b^2$, in the periphery of the disk. A a dog R, pivoted on the pin $p'$ on the face plate, will, when thrown out so as to contact the bar $B^3$, act like a cam, and push the bar back. (See Fig. 6.) This dog R, is brought into position to thus push the bar $B^3$, back by a cam-face $p^2$ (see Fig. 10) on a vertically sliding bar P, (see Figs. 6, 8 and 9) and this bar P, is only moved upward so as to thus operate the dog when the till is closed, being so moved by the cam $a^3$ on the till cover, see Fig. 8, which shows the till closed, and the bar P, up and sustained by a spring catch S. This is the same position of parts as is shown in Fig. 6. Back of the catch S, is an arm $d'$, which extends from the arm D', of the tilting frame D. Now, we have seen that as soon as the operating pin C, is pushed in, at the beginning of an operation, it tilts the frame back. Hence at the beginning of an operation the arm $d'$ on the arm D', will draw back the catch S, and the bar P, will be disengaged and drop into the position shown in Fig. 9. This will remove the cam-face $p^2$ away from the dog R, and allow it to drop away from the operating wheel B, and leave the bar $B^3$ free to move by the action of the spring $b^7$, and thus engage the head of the pin C, and prevent the pin being withdrawn until the till has been opened and again closed, and this cannot be done until a full operation is performed, for, as we have seen, the till cannot be opened until the lever H', is disengaged from the catch $a^2$ (see Fig. 3) and this can only be done by the bar H, which only comes into action at the close of an operation.

After the operation has been completed, the operator must yet close the till, and bring the parts into position shown in Figs. 6 and 8, before he can withdraw the pin C, so as to begin a new operation.

If the proprietor of a shop is operating his own machine and does not care to be restricted by the foregoing pin-locking mechanism, he may remove the operating wheel, and turn the dog T up so its end will set under the offset $t$, on the bar P and this will hold the bar P, up permanently and thus throw the pin-locking mechanism out of gear.

The operating wheel B, is retained in place upon the shaft B', by the bolt $b'$, of the lock $B^2$, which enters the groove $b'$, in the shaft B'. There is an arm $b^8$ extending from the bolt $b^6$, which draws back the sliding bar $B^3$, so that when the lock is so turned as to allow the wheel to be removed, the bar $B^3$ will be held back clear of the pin C, thus allowing it to be drawn out. So it will be seen that the wheel B, may be removed, by a person having a proper key at any time. This is desirable for two reasons: first, that it allows the proper person to observe the total amount registered on register wheels inside of said wheel B, and secondly, the proper person may obtain access to the machine for the purpose of adjusting mechanism or resetting of registering device back to zero when it may be desired.

A second lock U, is provided for locking the wheel B against movement at any time, and thus preventing any action of the machine, even to the opening of the till. This lock U, acts upon a dog U', (see Fig. 6,) and holds it in one of the depressions $b^2$, on the periphery of the wheel B.

A dog V, (see Figs. 3, 4 and 6) acts by gravity, upon the units wheel F, engaging with the notches $f$, and at all times prevents backward movement of the works, but leaves them free for forward movement.

When a new movement is begun, the pin C is drawn out. This releases the tablet wheel, which has been displaying the amount of the last registration, and the spring $e^3$, (see Fig. 11) reacts the tablet wheel to zero. I provide means for causing this reacting wheel to ring the bell, in addition to the ringing of the bell at the completion of an operation, as in the aforesaid Spaulding patent. The object of this additional ring is to give warning immediately, if the machine is being tampered with, and before any movement of the registering wheels has occurred. The bell ringing device I have thus provided, also serves to prevent any rebound of the tablet wheel, which is desirable, because, if the pin was instantly shoved back in, the tablet wheel might be caught out of place, and thus disturb the indication. These means are as follows: On the tilting frame D, (see Fig. 11) there is a spring-dog W, which has an arm W', (see Fig. 12) that extends out so as to engage the bell-hammer lever M, and whenever the spring-dog W, is depressed at its free end, the bell hammer will be operated. Extending from the hub of the tablet wheel E, is an arm $E^2$, which has a notch $e^2$, therein (see Fig. 12), and when the operating pin pushes back the frame D, the dog W, will come into line with the notch $e^2$, and the dog will not be engaged by the arm $E^2$, as the wheel E, is turned to make an indication but when the pin is pulled out, the tablet wheel is free to react, and the frame D, having previously moved forward at the completion of the operation, by the action of the spring $e^2$, as in said Spaulding patent, and then the notch $e^2$, and the dog W, are out of alignment, and the arm $E^2$ will contact with the dog W, and thus will ring the bell, and after $E^2$, has passed the dog, it will be prevented from reacting back on a rebound, by the upturned end of the dog.

What I claim as new is—

1. In a cash register and indicator of the type herein shown, the combination with the cents registering wheel F; and the dollar registering wheel, I; of the higher registering wheel, J, said wheels being mounted concentrically and said wheel, J, being smaller than said wheel, I, and placed immediately in front thereof; an anchor lever, K, in the plane of the wheel, J, and operating said wheel, J; the cam lug I' on the face of the wheel I for operating said anchor lever K.

2. In a cash register and indicator of the type herein shown, the combination with the operating wheel; the register wheel; and an operating pin that serves to lock the operating wheel with the registering mechanism, is carried by said operating wheel, is moved outwardly and inwardly at each operation and has a shoulder thereon; of a catch bar for engaging said shoulder and preventing the withdrawal of said pin; and means for disengaging said catch bar from said pin when the operating wheel has been moved to the finish of an operation.

3. In a cash register and indicator of the type herein shown, the combination with the operating wheel; the registering wheel; and an operating pin that serves to lock the operating wheel with the registering mechanism, is carried by said operating wheel, is moved inwardly and outwardly at each operation and has a shoulder thereon; of a catch bar for engaging said shoulder and preventing the withdrawal of said pin; a dog for engaging the registering mechanism and preventing its backward movement; and means for disengaging the catch bar from the pin when the operating wheel has been moved to the finish of an operation.

4. In a cash register and indicator of the type herein shown, the combination with the operating pin C, having a shoulder thereon, of a catch bar for engaging said shoulder and preventing the withdrawal of said pin, a money receptacle that is opened during the operation of making a registration and means for disengaging said catch bar from said pin when the operating wheel B, has completed an operation, said disengaging means being operated by closing the said money receptacle.

5. In a cash register and indicator of the type herein shown, the combination of the operating wheel B, the operating pin C, carried by said wheel and having a catch shoulder, the sliding bar $B^3$, carried by said wheel and engaging said shoulder when the pin is shoved in, the pin dog R, for reacting said bar $B^3$, the vertically moving bar P, for moving said dog, and means for operating said bar P, as the money receptacle is closed.

6. In a cash register and indicator of the type herein shown, the combination of the cam $a^3$, on the money till, the bar P, having notch $p^3$, the spring catch S, engaging said notch, the arm $d'$, from the tilting frame D, for disengaging said catch, the operating wheel B, the operating pin C, the catch bar $B^3$, and the dog R.

7. In a cash register and indicator that is operated by a variable rotative movement of an operating means, the combination with means for locking the operating mechanism during one operation against the succeeding operation; of means normally operated by the operation of the money receptacle for unlocking said locking mechanism at the close of each operation; and means whereby said unlocking mechanism can be made to operate independently of the operation of the money receptacle for the purposes set forth.

8. In a cash register and indicator of the type herein shown, the combination with the operating pin C, having a shoulder thereon; a catch bar for engaging said shoulder and preventing the withdrawal of said pin; the money receptacle that is opened during the operation of making the registration; and means for disengaging said catch bar from said pin when the operating wheel B has completed an operation, said disengaging means being normally operated by the operating of the money receptacle; of means whereby said disengaging means are made to operate independently of the opening and closing of said money receptacle.

9. In a cash register and indicator that is operated by a variable rotative movement of an operating means, the combination with means for locking the operating mechanism during one operation against a succeeding operation; of a money receptacle extending in front of the upper case $A^2$; a pivoted till cover $A'$ for closing said money receptacle; of means normally operated by the closing of said till cover for unlocking said locking mechanism at the close of each operation; and means whereby said unlocking mechanism may be made to operate independently of the operation of the money receptacle.

10. In a cash register and indicator of the type herein shown, the combination with the shaft $B'$, having a groove $b'$, the operating wheel B, on said shaft and the lock $B^2$, for holding said wheel on the shaft by means of its bolt $b^6$, entering said groove $b'$.

11. In a cash register and indicator of the type herein shown, the combination with the shaft $B'$; an operating wheel mounted on said shaft; an operating pin carried by said wheel and having a shoulder thereon; a catch bar $B^3$ that engages the shoulder on said pin; a lock $B^2$ for locking the operating wheel against longitudinal movement on the shaft $B'$; and means connected with the lock $B^2$ which disengages the latch bar from the pin when the lock $B^2$ is actuated to release the operating wheel.

12. In a cash register and indicator of the type herein shown, the combination with the operating wheel B, having depressions $b^2$, on its periphery, of the dog $U'$ for engaging said depressions and the lock U, for actuating said dog.

13. In a cash register and indicator of the type herein shown, the combination with the tablet wheel E, having the arm $E^2$, with notch $e^2$ therein, the tilting frame D and the bell-hammer lever M, of the spring dog W, on the tilting frame D, for the purposes stated.

In testimony whereof I affix my signature in presence of two witnesses.

ELMER S. SMITH.

Witnesses:
JNO. K. HALLOCK,
JOSIAH T. LOVEJOY.